United States Patent Office 2,780,580
Patented Feb. 5, 1957

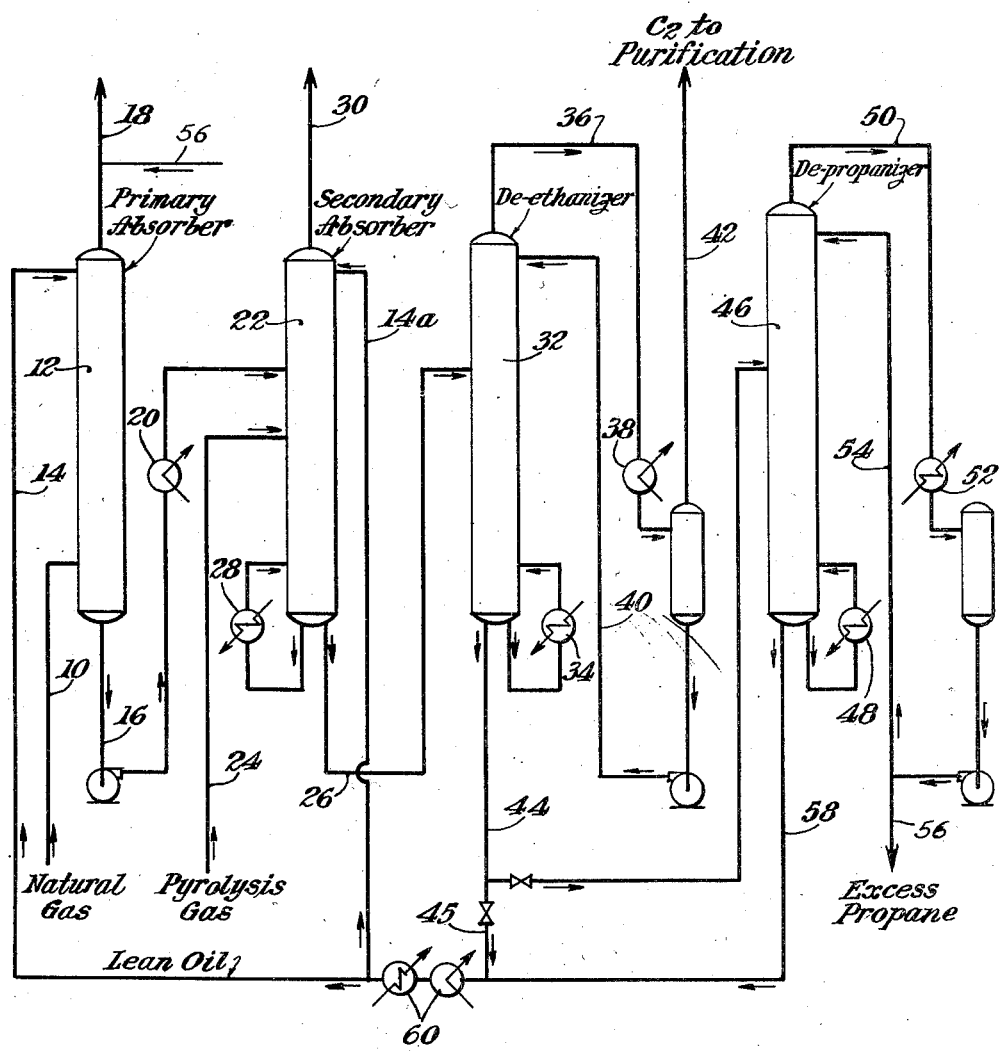

2,780,580

PRODUCTION OF ETHYLENE

Ludwig Kniel, Scarsdale, N. Y., assignor to The Lummus Company, New York, N. Y., a corporation of Delaware Application March 4, 1953, Serial No. 340,283

9 Claims. (Cl. 196—8)

This invention relates to the production of ethylene from natural gas and more particularly to a multiple stage absorption process for the removal of particular components of the gas mixture so that the desired quality of product may be obtained at the minimum cost.

While it is appreciated that natural gas does not have any ethylene, it is known that commercial yields of ethylene can be produced from the paraffinic components of natural gas when suitably cracked.

It is one of the important features of my invention to selectively recover ethane from the natural gas and to crack the same to produce ethylene. A further feature of my invention is to recover in addition to ethane heavier, higher boiling components of the natural gas, in particular, propane and return the same to the primary absorber off gas stream, to give the off gas a heat value of approximately 950 to 1000 B. t. u./cf.

Due to the overlapping nature of the boiling points of the components of the natural gas as well as the pyrolysis gas resulting from the cracking of the ethane, and due to the need to completely remove certain of the impurities to assure a high quality ethylene end product, I have found that a multiple stage absorption operation prior to fractionation is most effective.

I further find that optimum operations can be obtained with only partial recovery of the ethane from the natural gas. The partial recovery of ethane from natural gas along with the removal of propane is accomplished in a primary absorber to which a lean oil having a boiling range of 100–400° F. is introduced. Thereafter, I prefer to charge the fat oil to a second absorber to which the products of pyrolysis are also introduced, and by operating the second absorber under predetermined conditions of temperature and pressure, the fat oil can be used to absorb further quantities of the $C_2$ and higher hydrocarbons.

Further specific features of my invention will appear from the following description of a preferred form of embodiment of my invention taken more particularly with the attached drawing which is a simplified flow sheet of a multiple stage absorption system.

The natural gas feed 10, containing about 75% of methane, 20% ethane, 5% of propane and impurities of hydrogen sulfide, carbon dioxide and nitrogen, is introduced to the primary or ethane absorber 12 to which a lean oil is introduced at 14. The temperature and pressure in the primary absorber is such that a major portion of the ethane present in the natural gas feed, together with the heavier materials, are removed in the fat oil through the line 16. The overhead at 18 contains the remainder of the ethane, the methane and lower boiling components.

The fat oil at 16 is then passed through a refrigerated cooler 20 into the secondary or ethylene absorber 22. This is preferably accomplished at an upper, but not the top part of the column, as will be hereinafter explained. Pyrolysis gas is also introduced in this absorber through the line 24, such pyrolysis gas being effluent from a cracking heater (not shown) and containing substantial proportions of ethylene.

By operating the secondary absorber 22 at either a lower temperature or a higher pressure, or both, than the primary absorber 12, it is possible to obtain further absorption in the fat oil 16 of the ethane, ethylene and higher boiling components. Preferably, the secondary absorber is operated at about 500 p. s. i. g. and at sub-atmospheric temperatures. Fresh lean oil is introduced through the line 14a to the upper part of the secondary absorber and all of the ethylene, ethane and higher boiling components in the fat oil are removed at 26. A reboiler 28 is used for the bottom of this absorber to drive off all of the methane and lower boiling components which are removed overhead at 30.

The fat oil 26 from the bottom of the secondary absorber, is now passed to the deethanizer tower 36 which is provided with a reboiler 34 and operated under conditions to drive off the $C_2$ fractions overhead through line 35, certain of which are condensed at 38 and refluxed at 40 to the top of the tower. The net overhead in line 42 is then passed to an ethylene recovery unit from which the ethane is made available for pyrolysis and the purified ethylene is removed as end product.

The bottoms from the deethanizer 32, removed through the line 44, contains the propane and higher boiling materials, part of which may be introduced through line 45 to the lean oil line 14 and the remainder of which are introduced into the depropanizer column 46.

The depropanizer tower 46 is provided with a reboiler 48 and is operated under temperature and pressure conditions such that propane is removed overhead at 50, such propane being condensed at 52 and used in part as reflux through the line 54 with the excess propane removed in line 56. The excess propane in line 56 may be introduced to the off-gas overhead in line 18 of primary absorber 12 to provide such off-gas with an increased heat value. The bottoms from the depropanizer tower removed at 58 constitute the remainder of the lean oil which may be of the nature of natural butanes, pentanes, or any mixture thereof or gasoline or parts thereof. It will be appreciated that such bottoms are necessarily cooled as by the heat exchangers 60 before entering the lean oil line 14. The lean oil should have a boiling range within 100° to about 400° F.

I prefer to separate the ethane from the natural gas feed for cracking to ethylene because it normally has a value only that of its fuel and yields more ethylene on cracking than does the propane. I propose to preferentially operate ethane absorber 12 for only partial recovery of ethane but absorber 22 for maximum recovery of ethylene, in other words for given flows of natural gas through line 10 and of pyrolysis gas through line 24 I propose to operate with a lean oil circulation such, that at ambient conditions in absorber 22 upwards of 75% of the ethylene entering are recovered by means of the oil introduced through line 14a, while not over 75% of the ethane is recovered by the same lean oil introduced through line 14 at the conditions of pressure and temperature existing in absorber 12. In doing this an additional object of my invention is to accomplish the retention in the fat oil from absorber 12 of minimum amounts of methane so as to provide a concentrated stream of relatively pure hydrogen as off-gas from absorber 22.

In order to accomplish this object economically I also prefer to operate absorbers 12 and 22 at pressures and temperatures such that the additional amount of lean oil introduced through line 14a is a very minimum and that the total amount of refrigeration expended on the lean oil in cooler 60 is within the limits of economical plant design.

It will be appreciated that the off-gas at 30 from the secondary absorber 22 will be of substantial value due to its richness in hydrogen. The pyrolysis gas from the cracking of ethane contains about four to six times as much hydrogen as methane and if the methane content of the fat oil stream 16 is low, I can undertake to recover hydrogen of substantial purity for certain synthesis operations as off-gas 30 for absorber 22.

My invention thus depends upon the objective of producing ethylene of high purity from a natural gas in which no ethylene occurs, through the intermediary of a multiple stage absorption by which substantial economies and easy control are possible.

It will be apparent that I have disclosed a preferred form of embodiment of my invention and that modifications may be made that are within the scope and spirit of the disclosure herein and of the claims appended hereinafter.

I claim:

1. The method of producing ethylene of high purity from natural gas containing predominant quantities of methane and minor quantities of ethane and higher boiling components which comprises, passing the natural gas to first stage absorption operated under conditions of temperature, pressure and lean oil absorbent to recover a major part of the ethane in the absorbent and to release a minor amount of ethane and lower boiling components overhead, passing the fat oil absorbent to second stage absorption, introducing a pyrolysis gas effluent from ethane cracking to said second absorption stage at a point below the point of introduction of fat oil to said stage, said effluent including substantial amounts of ethylene, hydrogen and methane, maintaining said second stage absorption under temperature and pressure conditions to substantially recover all of the ethylene and heavier components in the absorption oil, passing the rich oil from said second stage absorption to a fractionating zone, withdrawing substantially all the ethylene and ethane as an overhead from said fractionating zone, withdrawing a bottoms product from said fractionating zone and introducing a portion of said bottoms product as lean oil to the first and second absorption stages.

2. The method of producing ethylene as claimed in claim 1 in which the lean oil absorbent in the first absorption stage and in the second absorption stage is a gasoline boiling range hydrocarbon.

3. The method of producing ethylene as claimed in claim 1 in which the pressure in the second stage absorption is higher than in the first stage.

4. The method of producing ethylene as claimed in claim 1 in which the temperature in the second stage is lower than in the first stage.

5. The method of producing ethylene as claimed in claim 1 in which the fat oil from the second absorber is fractionated in two stages to produce substantially pure propane and said propane is introduced to the off-gas from the first stage absorber to provide a heating gas of predetermined heat content.

6. The method of producing ethylene of high purity from natural gas containing predominant quantities of methane and minor quantities of ethane and high boiling components which comprises, passing the natural gas to a first absorption zone operated under conditions of temperature, pressure and lean oil absorbent to recover a major part of the ethane in the absorbent and to release a minor amount of ethane and lower boiling components overhead, passing the fat oil absorbent to a second absorption zone, introducing a pyrolysis gas effluent from ethane cracking to said second absorption zone at a point below the point of introduction of fat oil to said zone, said effluent including substantial amounts of ethylene, hydrogen and methane, operating said second absorption zone under temperature and pressure conditions to substantially recover all of the ethylene and heavier components in the absorption oil, passing the rich oil from said second absorption zone to a first fractionation zone and withdrawing substantially all the ethylene and ethane as an overhead, withdrawing a bottoms product from the first fractionation zone and passing a first portion of said bottoms to a second fractionation zone, withdrawing an overhead from said second fractionation zone and withdrawing a bottoms product from said second zone, combining said bottoms product from the second fractionation zone with the remaining bottoms portion from the first fractionation zone and passing said combined bottoms to the primary and secondary absorption zones as lean oil absorbent.

7. The method of producing ethylene of high purity from natural gas containing predominant quantities of methane and minor quantities of ethane and higher boiling components as claimed in claim 6 wherein the overhead from the second fractionation zone comprises substantially pure propane and said propane is returned to the overhead of the first absorption step.

8. The method of producing ethylene of high purity from natural gas containing predominant quantities of methane and minor quantities of ethane and higher boiling components as claimed in claim 6 wherein the combined bottoms are cooled prior to introduction to the primary and secondary absorption zones to a temperature below the temperature of the off gas of said first absorption zone.

9. The method of producing ethylene of high purity from natural gas containing predominant quantities of methane and minor quantities of ethane and higher boiling components as claimed in claim 6 wherein the first absorption zone is operated at a higher temperature and lower pressure than the second absorption zone.

References Cited in the file of this patent

UNITED STATES PATENTS

| | | |
|---|---|---|
| 2,125,235 | Atwell | July 26, 1938 |
| 2,325,813 | Throckmorton | Aug. 3, 1943 |
| 2,468,750 | Gudenrath | May 3, 1949 |
| 2,486,543 | Wenzke | Nov. 1, 1949 |
| 2,573,341 | Kniel | Oct. 30, 1951 |
| 2,629,753 | Frevel et al. | Feb. 24, 1953 |
| 2,640,008 | Heath | May 26, 1953 |